United States Patent [19]
White

[11] Patent Number: 4,839,057
[45] Date of Patent: Jun. 13, 1989

[54] WATER TREATMENT SYSTEM
[75] Inventor: Harold R. White, New Lenox, Ill.
[73] Assignee: Alar Engineering Corporation, Mokena, Ill.
[21] Appl. No.: 102,635
[22] Filed: Sep. 30, 1987
[51] Int. Cl.[4] .............................................. C02F 9/00
[52] U.S. Cl. .................................... 210/667; 210/669; 210/721; 210/724; 210/744; 210/86; 210/104; 210/143; 210/199; 210/202; 210/219; 210/257.1; 210/916; 210/917
[58] Field of Search ............... 210/667, 669, 682, 687, 210/702, 721, 723, 724, 726, 738, 744, 143, 900, 86, 104, 138-140, 181, 199, 202, 205-208, 219, 221.2, 254, 257.1, 258, 259, 916, 917

[56] References Cited

U.S. PATENT DOCUMENTS

| | | | |
|---|---|---|---|
| 4,029,576 | 6/1977 | Shivers | 210/667 |
| 4,329,224 | 5/1982 | Kim | 210/724 |
| 4,412,924 | 11/1983 | Feather | 210/744 |
| 4,659,481 | 4/1987 | Chen | 210/697 |
| 4,676,908 | 6/1987 | Ciepiela et al. | 210/669 |

Primary Examiner—Ivars Cintins

[57] ABSTRACT

A method and apparatus for the removal or reduction of inorganic contaminants, hardness, radionuclides, organic contaminants, odor, turbidity, discoloration, and objectionable taste from water, subjects the water to lime-phosphate softening, aeration, sedimentation, filtration and ion exchange in an automatic cycle especially suited for home and small commercial usage. The raw water, such as well water, is first subjected to a cold lime softening and aeration treatment, then to a phosphate treatment followed by settling and filtering. The thus treated water is supplied to a pressurized tank feeding a conventional ion exchange water softening unit as the water is tapped for use. No heat input is needed but the treated water can be heated as desired for use. An electrical control system regulates the water and chemicals input agitation, aeration, the time of chemical treatment in successive stages and the maintenance of a desired head pressure for the treated water. The apparatus is compact, fully automatic in operation, low in cost and is well suited for use in private homes.

20 Claims, 3 Drawing Sheets

WATER TREATMENT SYSTEM

BACKGROUND OF THE INVENTION

1. Field of the Invention

This invention relates to the art of purifying water and especially deals with a method and apparatus for automatically and sequentially subjecting raw water, such as well water, to a series of treatments which completely or substantially remove both organic and inorganic contaminants, radionuclides, objectionable odors, turbidity and reduce hardness, and to supply upon demand potable water for household or commercial use.

2. The Prior Art

Various processes are currently in use for the treatment of well water to render it suitable for use for boiler feed water, household use and the like. For large installation these processes include:
  Cold lime softening.
  Cold lime—soda softening.
  Hot lime softening.
  Hot lime—soda softening.
  Hot process phosphate softening.
  Ion exchange.
  Carbon adsorption.

The operations required for these processes usually include:
  Coagulation and flocculation.
  Sedimentation and clarification.
  Filtration.
  Aeration.
  Chlorination.

These processes require large complicated chemical treatment apparatus that must be serviced by skilled operators and are so expensive that they can only be afforded by large, municipal and commercial users.

For smaller installations the processes used are:
  Ion exchange.
  Distillation.
  Reverse osmosis.
  Ultrafiltration.
  Carbon adsorption.

The operations used with these processes are:
  Coagulation—flocculation.
  Permanganate addition.
  Filtration.
  Chlorination.

These processes are normally problem specific i.e. permanganate addition and filtration for iron removal, ion exchange for hardness removal, reverse osmosis or distillation for dissolved solids reduction and carbon adsorption for odor and taste removal. Equipment costs and operating costs are high for the volume of water treated, and the equipment requires frequent maintenance and parts replacement.

It would therefore be an improvement in this art to provide an automatic water treatment system sufficiently low in cost, small, simple and reliable in operation as to be useful in single family homes and commercial plants to convert an otherwise undesirable water source into high quality potable water, useable on demand.

While lime and monosodium phosphate are the preferred chemicals to achieve the desired water quality in the final product, the lime may be in the form of calcium oxide or calcium hydroxide. Monosodium phosphate may be replaced wholly or in part with almost any acid such as sulfuric, hydrochloride or phosphoric. Such acids, however, may cause difficulty in controlling the pH of the product. For example, if the pH becomes less than 7 the anions will become soluble and remain in the treated water.

SUMMARY OF THE INVENTION

According to this invention raw contaminated water, such as well water, is pumped into a mixing and settling tank containing a residue or "Heel" of previously precipitated solids from an earlier water treatment. During the water inflow to the tank, the contents of the tank are agitated and aerated. For this purpose a motor driven agitating propeller and jet stream of air may be used. Dry lime is added to the agitated and aerated contents of the tank during the water inflow and is regulated in amounts to develop a pH greater than 10.5. When the tank is filled, the water inflow, agitation and lime addition are stopped, but the aeration is continued for about 5 to 10 minutes. Aeration is then stopped and the solids are allowed to settle to the bottom of the tank. The settling period is usually around 20 to 25 minutes in a tank having a capacity of about 150-3000 gallons.

The clear water, above the settled residue is then pumped from the lime addition tank to a second mixing and settling tank of about the same capacity of the first tank. This second tank also contains a residue or "Heel" of previously precipitated solids from an earlier water treatment. During the transfer of the water from the first to the second tank, the water in the second tank is agitated permitting intimate mixing of the incoming water and the residue. A 25% monosodium phosphate water solution is added to the second tank after the water input to adjust the pH of the contents of the second tank to about 7.2-7.6. The phosphate solution can be supplied from a smaller tank of, say, about 5-50 gallons capacity and the solution input is automatically controlled to reduce the pH to the desired level. Agitation in the second tank is continued for about 5 minutes after the transfer is completed and the solids are then allowed to settle for an extended period of about 1 hour.

The clear water above the settled out solids residue in the second tank is then pumped to a storage tank to provide reservoir for the system. This reservoir or storage tank may have about the same capacity as the first lime treating tank and the second phosphate treating tank.

Water from the third or reservoir tank is then pumped through a filter system effective to filter out particles down to about 5 microns. The filtered water is maintained under pressure by a booster pump and is fed into a pressure tank where it accumulates to provide a purified pressurized water supply for use upon demand. As the water is tapped from this pressurized supply tank it flows through a water softener of a standard ion exchange type.

The system does not require a heat input but, if desired, a conventional water heater can be interposed after the water softener to provide hot water for use.

The system efficiently accomplishes the following results at low cost:
  Inorganic Contaminant Removal
    Fluoride—Reduced to <0.1 mg/l by co-precipitation with Magnesium Hydroxide.
    Arsenic—95% removal by precipitation.
    Selenium—50% removal.
    Hydrogen—Sulfide—100% removal by oxidation to elemental sufur.

Iron 100% removal by oxidation and precipitation as $Fe(OH)_3$ and $Fe_2(CO_3)_3$.

Manganese—100% removal by oxidation and precipitation.

Hardness Removal

Magnesium—Reduced from 80 mg/l to 35 mg/l by precipitation.

Calcium—Reduced from 160 mg/l to 75 mg/l by precipitation.

Silica—50% removal by co-precipitation with $Mg(OH)_2$.

Radionuclides

Radium 226 and 228—reduced from 12 p Ci/l to <1 p Ci/l. (Picocuries/liter)

Gross α—Radiation reduced from 50 p Ci/l to 3 p Ci/l.

Gross B—Radiation reduced from 60 p Ci/l to <8 p Ci/l.

Organic Contaminant Removal

Removed by Aeration—
Chloroform
Benzene
Bromoform
Carbon Tetrachloride
Chlorobenzene
Perchloroethylene
Hexane
Decane Removed by Precipitation & Coagulation—
Fulvic Acid
Humic Acid Taste and Odor Removal Taste improved by removal of Iron, Manganese, Colloidal silts and Clays.

Odor—Removed of $H_2S$ (rotten egg smell) and volatile organics.

Turbidity

Reduced from 10 to <1 TU

The system is automatic in operation requiring only periodic checks for adequacy of the treating chemicals and drainage of residue from the treating tanks. The cartridges of the filter units should also be checked and changed as needed.

The water level in the first or lime treating tank should be at least ½ full before the aerator, the agitator and the lime feeder are started. Automatic timers and level controls then control the duration of operation of these devices, the settling time, the operation of the transfer pump, the filling of the phosphate treating tank, the feed of the monosodium phosphate solution to the tank, the operation of the aerator, the settling time, and operation of the transfer pump to feed the clarified treated water to the reservoir. The reservoir is then automatically emptied upon demand by the pressurized supply tank. Removal of sludge from the lime treating tank and phosphate treating tank can be manually or automatically accomplished at periodic intervals.

It is then an object of this invention to provide a simple, low cost, automatic water treating system operating on a cold lime and phosphate treating cycle to supply potable water for household and commercial use from a raw water source that may be highly contaminated.

A further object of this invention is to provide a compact low cost automatic water treating system for household use.

Another object of this invention is to provide a method and apparatus for converting raw contaminated well water into a potable pressurized water supply that can be tapped for household usage.

Another object of this invention is to provide a household type water purifier and softener performing sequential chemical treatment to remove soluble organic and inorganic contaminants, radionuclides, and entrained particles to produce a water supply meeting all of the standard requirements for household use.

A specific object of this invention is to provide a batch-type water treating plant especially adapted for household usage which will convert contaminated raw well water into a pressurized purified water source supplying conventional household water outlets.

Other and further objects of this invention will become apparent to those skilled in this art from the annexed sheets of drawings which, by way of a preferred mode embodiment, illustrate a water treating system of this invention.

ON THE DRAWINGS

AS SHOWN ON THE DRAWINGS

Figure 1:
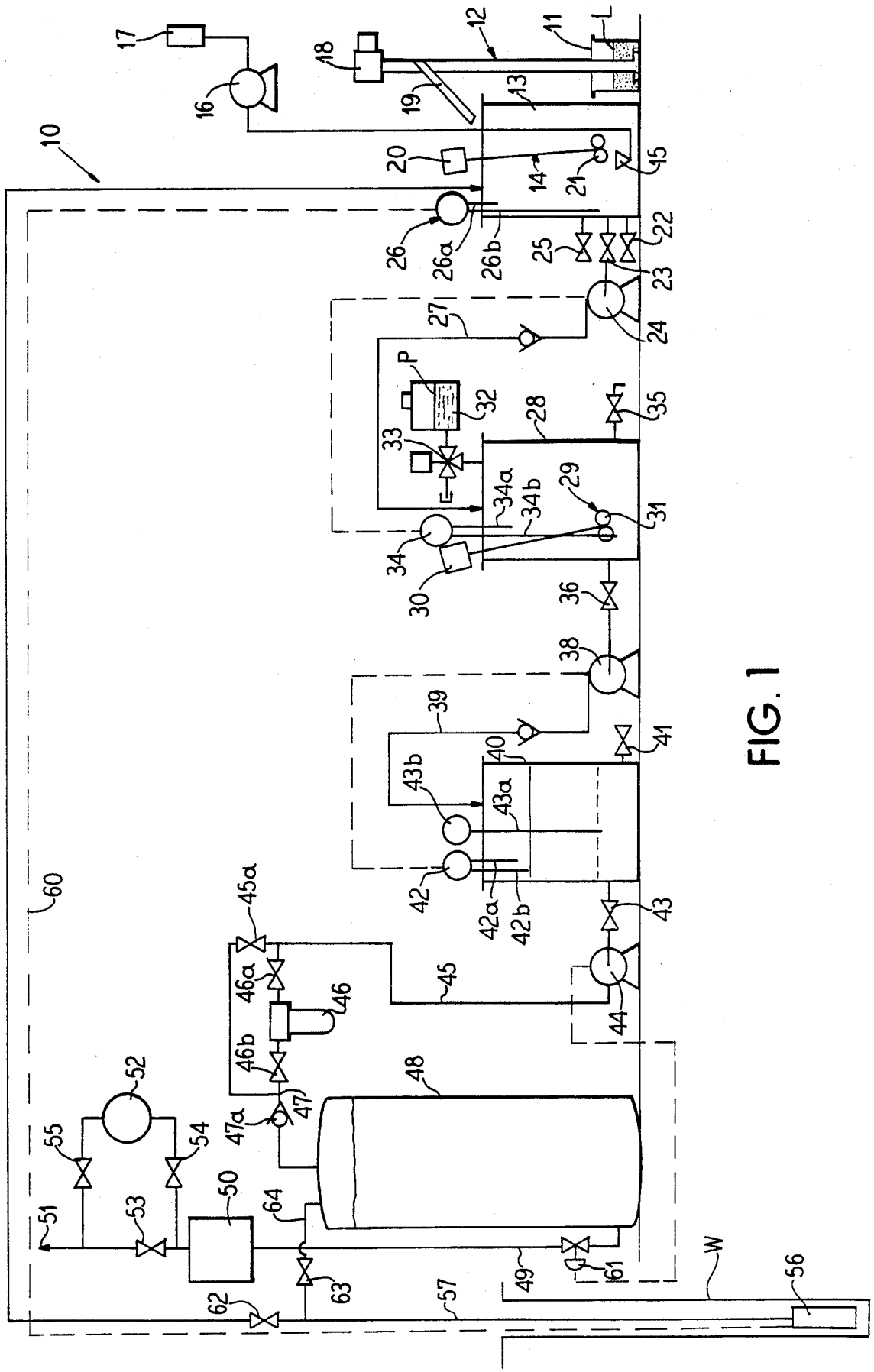
FIG. 1 is a diagrammatic view of a water treating system of this invention.

In FIG. 1 reference numeral 10 designates generally a schematic illustration of an installation of a raw well water treating system of this invention. The apparatus 10 includes a dry lime container 11, a feeder 12 supplying lime from the container 11 to a lime mixing tank 13 which contains a motor driven mechanical agitator 14 and an aerator 15 receiving compressed air from a blower 16 that is supplied with ambient air through a filter 17. Dry lime L is lifted from the container 11 by the feeder 12 which is driven by an electric motor 18 to discharge the lime over a chute 19 into the top of the tank 13. An electric motor 20 drives the agitator 14 which has a conventional agitating propeller 21 at a level above the bottom of the tank 13.

A residue drain valve 22 is provided at the bottom of the tank 13. A valve 23 at a higher level above the valve outlet 22 supplies a transfer pump 24 while a top valve 25 can be used to check the clarity of the water above the settled out residue.

A control 26 with high and low sensing probes 26a and 26b regulates the level of the water in the tank 13.

The pump 24 discharges the settled clarified water from the tank 13 through a pipeline 27 to the top of a phosphate treating tank 28. This tank 28 is equipped with an agitator 29 with an electric motor 30 driving a propeller 31 above the bottom of the tank.

A tank 32 containing a monosodium-phosphate water solution P feeds controlled amounts of the solution to the top of the tank 28 under control of a motor operated solenoid flow valve 33. A pump down control 34 with high and low probes 34a and 34b similar to the control 26 regulates the high and low levels of water in the tank 28 by activating or stopping the pump 24.

The bottom of the tank 28 has a drain valve 35 to remove excess residue and a valve 36 at a higher level controls flow of clarified water to a transfer pump 38 feeding a supply line 39 to the top of a reservoir tank 40. This reservoir tank has a bottom outlet drain valve 41 and a pump down controller 42 with high and low level probes 42a and 42b to maintain an operating high level range of treated water in the reservoir tank 40. The controller 42 activates the pump 38 when the level in tank 40 falls below the probe 42b and stops the pump when the level reaches the higher probe 42a.

A valve 43 at a level just below a low level alarm probe 43a of an audible alarm 43b feeds a booster pump 44 supplying a pressure line 45 either directly to or by passing a multiple cartridge filter 46 and discharging through a line 47 to a pressurized storage tank 48. Suitable valving 45a, 46a and 46b controls direct flow from 45 to 47 or through the filter 46 with a check valve 47a preventing back flow. The supply tank 48 discharges through a line 49 to a conventional water softener 50 to supply the household piping system 51. If desired, a hot water heater 52 can be provided to receive water from the softener 50 with suitable valving 53, 54 and 55 controlling a by-pass from the softener 50 through the heater 52 to the piping system 51.

The contaminated raw water supply is illustrated as coming from a well W with an electric motor driven pump 56 feeding a supply line 57 to the top of the lime tank 13 under control of the high and low level controller 26 correlated therewith as indicated by the dotted line 60.

A pressure valve 61 in the line 49 controls the pump 44 to maintain an operating water pressure in tank 48. In the event the water demand in the system 51 exceeds the supply capacity from the tank 40, the back pressure will not be maintained and the pump 44 will stop. The alarm 43b will be activated by the low level probe 43a in the tank 40. The system 51 will then be supplied direct from the well W by closing a valve 62 in the supply line 57 and opening a valve 63 in a by-pass supply line 64 to the tank 48. The treating system can recover after the high demand by the system 51 (such as the filling of a swimming pool) is satisfied. For this recovery the valve 63 will be closed and the valve 62 opened. The alarm can, of course, be deactivated during by-pass and filling of the tank 40 with treated water.

To initially place the apparatus 10 in operation, the container 11 is filled with a supply of about 50 pounds of dry hydrated lime and the tank 32 is filled with about 25 gallons of a 25% water solution of monosodium phosphate. The well pump 56 is energized, and the raw well water is supplied to the tank 13. When the tank is about half filled, the lime feeder 12, the agitator 14, and the airblower 16 are energized. When the tank 13 is filled, the controller 26 de-energizes and the pump motor 56 is stopped. The pH level of the water in tank 13 is checked with pH paper or a pH meter and when the pH exceeds 10.5, the lime feeder 12 and the agitator 14 are stopped. After about 5 minutes delay the blower 16 is stopped and the slurry in the tank is allowed to settle for about 20 minutes whereupon the transfer pump 24 is energized pumping the clarified water into tank 28. When this tank is filled, the phosphate solution is introduced until a pH reading of 7.2 to 7.6 is reached. The agitator 29 thoroughly mixes the phosphate with the water and is stopped after about 5 minutes of operation allowing the slurry to settle in the tank 28 for about 60 minutes.

Next the transfer pump 38 is actuated pumping the clarified water to the reservoir tank 40 for dissemination as explained above. In the meantime the well pump 56 has been reenergized to again fill the lime tank 13.

After initial start up operations of several batches, a sufficient amount of residue will be built up in the tanks 13 and 28 to provide the "Heel" for automatic operation. When the settled out residues reach a level just below the valves 23 and 36, the valves 22 and 35 are opened to discharge the excess.

The "Heel" or residue accummulation in the lime treating and phosphate treating tanks effectively reduces the amounts of chemicals needed to treat subsequent batches of water. These residues contain unspent chemicals which, when agitated and aerated, create a viable slurry with the new batches of water. The residues build up in volume as the unspent chemicals from previous batches and the newly added chemicals react on the new batches of water to increase the amount of the settling precipitates.

The system is equipped with automatic timers which are initially manually set after the initial batches of water are treated and the desired volumes of "Heel" residues have been established.

Figure 2:
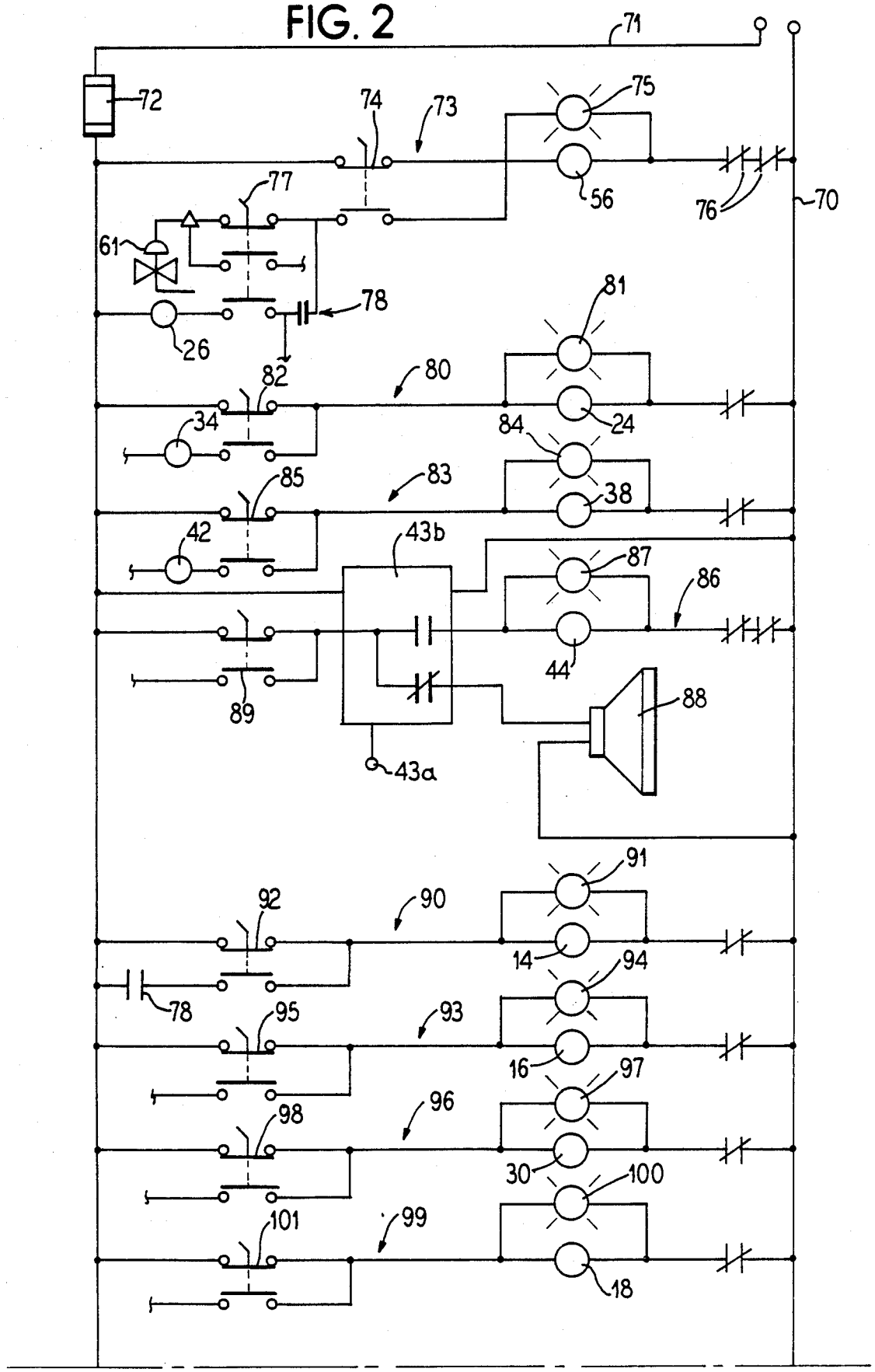
FIGS. 2 and 3 are an electrical diagram for the system of FIG. 1.
Figure 3:
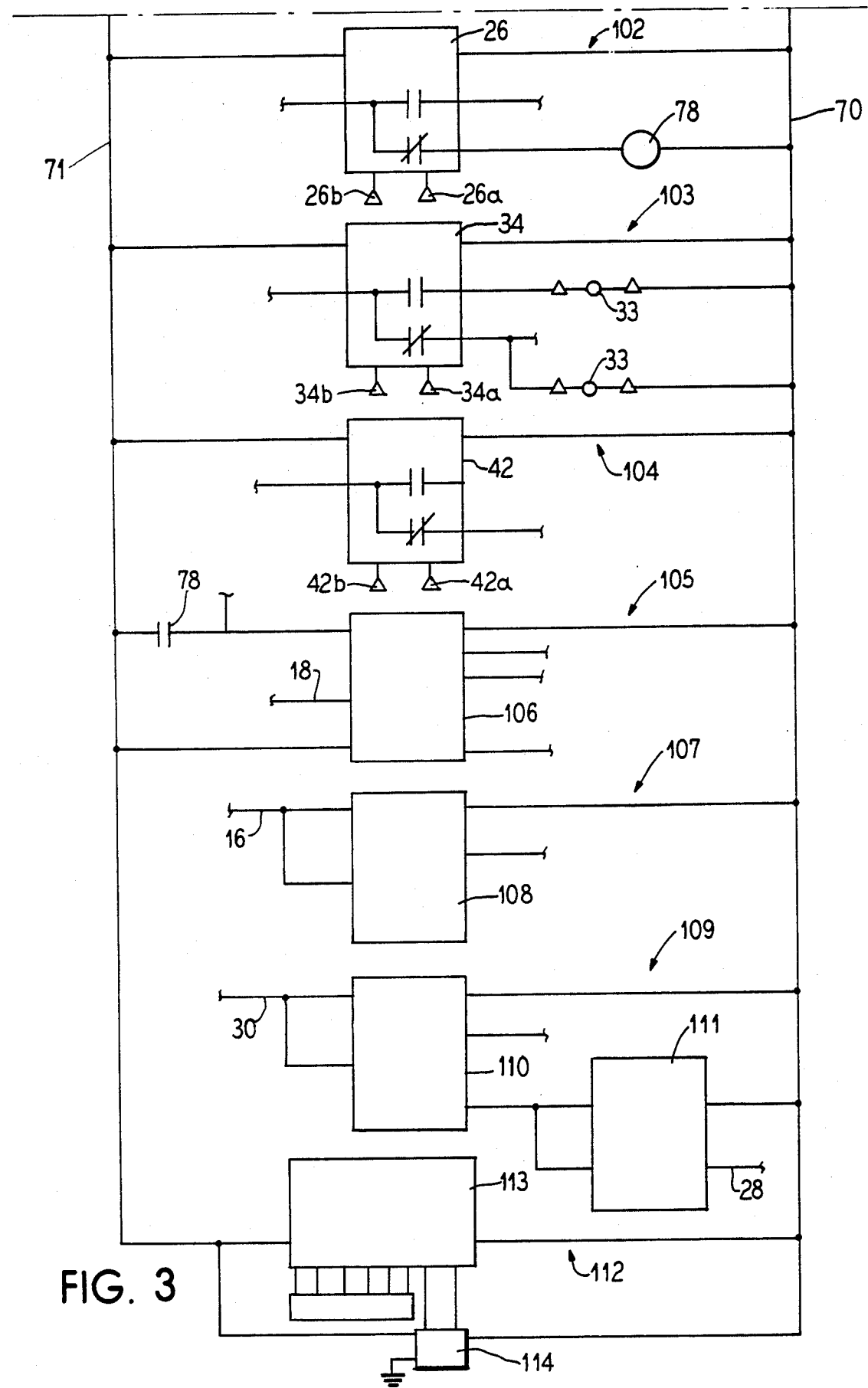

FIGS. 2 and 3 show a circuit diagram illustrating the electrical wiring for the system. In this diagram electrically controlled components have been marked with the same reference numerals used in FIG. 1.

As shown in FIG. 2, power lines 70 and 71 feed a plurality of circuits under the protection of a fuse 72.

A first circuit 73 energizes the well pump 56 under control of a two pole switch 74 shown in a manually closed position which will operate the pump for the initial start-up. An indicator light 75 is also energized when the pump is running. Overload protection 76 is provided in the circuit 73. When the switch 74 is placed in "Automatic" position a three pole switch 77 then takes over to allow the pressure valve 61 to control the system pump 44 (shown in circuit 86) and the high and low level pump down controller 26 to control the well pump 56 through relay 78 in the circuit.

A circuit 80 for the transfer pump 24 also includes an indicator light 81 and a double pole switch 82 which in the illustrated closed position drives the pump under manual control for the initial start-up and then placing it under control of the high and low level pump control 34.

A circuit 83 controls the phosphate transfer pump 38 with the indicator light 84 and a two pole switch 85 having a manual position for initial start-up and a automatic position for placing the operation of the pump 38 under the control of the high and low level controller 42.

A circuit 86 activated from the pressure valve 61 controls the pump 44 and light 87 together with the alarm system 43b to activate a horn or buzzer 88 when the level in the tank 40 drops below the probe 43a of the alarm system 43b. A double pole switch 89 provides for manual and automatic control during initial start-up and subsequent automatic operation.

A circuit 90 controls the operation of the lime tank agitator 14 and includes the conventional indicator light 91, double pole switch 92 and relay 78.

A circuit 93 controls the lime tank air blower 16 and it too has the indicator light 94 and switch 95.

The circuit 96 controls the phosphate tank agitator motor 30 with its indicator light 97 and switch 98.

A circuit 99 controls the motor 18 of the lime feeder 12 with its indicator light 100 and switch 101.

As shown in FIG. 3, the circuit 102 includes the control relay 78 in circuit relation with the lime tank level control 26.

A circuit 103 includes the level controller 34 for the phosphate tank 28 and also the two portions of the phosphate feed solenoid valve 33 while the circuit 104 includes the level control 42 for the reservoir tank, and a circuit 105 includes a timer 106 to control the duration of the operation of the feeder motor 18.

A circuit 107 controls a timer 108 for the air blower 16 while a circuit 109 controls timers 110 and 111 for the agitator 30 and for the settling time in the phosphate tank 28.

A circuit 112 operates a pH meter 113 and a recorder 114 which records the readings of the meter 113.

The circuitry is such as to provide for initial manual control for the start-up operation to build up the desired "Heel" in the lime tank 13 and in the phosphate tank 28 and an accumulation of treated water in the pressurized storage tank 48. Then, when the controls are switched to "Automatic", the circuitry will sequentially feed the well water to the lime tank, feed the lime to the incoming water, operate the agitator in the lime tank and the blower for the aerator. The sequence of these operations and the durations of the operations is automatically controlled from a previously set timer. The settling time is also automatically controlled followed by the transfer pump operation, the agitation in the phosphate tank, the feeding of the phosphate solution, and the settling time.

After treatment in the phosphate tank is completed the clarified water is fed through a reservoir tank en route to the filter system and pressurized storage tank. The valves for draining excess settled out residue can be manually operated or automatically operated to open when an excess level of residue accumulates.

From these descriptions it will be understood that a system of this invention provides sequential batch chemical treatment of water under automatic control to maintain a source of pressurized potable water for household or commercial use as needed. The system also provides for the softening of the chemically treated water by passage through a conventional salt type water softener en route to usage.

I claim as my invention:

1. The method of purifying contaminated water which comprises sequentially feeding impure water from a source through a plurality of tanks, feeding lime into a first tank, agitating the lime and water in the first tank, aerating the lime and water in the first tank, settling a residue from the treated water in the first tank, transferring clarified water from the first tank to a second tank, agitating the water in the second tank, feeding an acid into the water in the second tank, settling residue from the water in the second tank, transferring clarified water from the second tank to a reservoir tank, pumping water from the reservoir tank through a filter, transferring the filtered water to a pressurized storage tank, and selectively feeding the water from the storage tank through a water softener or direct to piping for end use.

2. The method of claim 1 including the steps of accumulating a supply of settled out residues in the first and second tanks for reuse in treating subsequent batches of water in these tanks.

3. The method of claim 2 wherein the settled out residues are drained from the tanks to maintain levels of the residue below the levels at which clarified water is transferred from the tanks.

4. A method of claim 1 wherein dry lime is fed into the first tank.

5. The method of claim 1 wherein a monosodium phosphate solution is fed into the water in the second tank.

6. The method of claim 5 wherein the monosodium phosphate added to the second tank is a 25% water solution.

7. The method of claim 1 wherein sufficient lime is added into the first tank to develop a pH greater than 10.5 in the water.

8. The method of claim 7 wherein sufficient acid is fed into the water in the second tank to reduce the pH of the water to about 7.2–7.6.

9. The method of claim 1 including the step of by-passing the treatments in the first, second and reservoir tanks and directly feeding the impure water to the storage tanks when the end use demand is greater than the capacity of the treatments in said tanks.

10. The method of claim 1 including the steps of maintaining the levels in the first and second tanks between preset high and low levels.

11. The method of claim 1 including the added step of maintaining the level of water in the reservoir tank at a high level and sounding an alarm before the level drops to the level at which the water is pumped from the reservoir tank.

12. The method of purifying contaminated water to reduce inorganic contaminants, hardness, radionuclides, organic contaminants, odor, turbidity, discoloration and objectionable taste which comprises sequentially feeding the contaminated water through a plurality of tanks, feeding lime into a first tank, agitating the lime and water in the first tank, aerating the lime and water in the first tank, settling a residue from the treated water in the first tank, transferring clarified water from the first tank to a second tank, agitating the water in the second tank, feeding a phosphate solution into the water in the second tank to reduce the pH of the water to about 7.2–7.6, settling residue from the water in the second tank, transferring clarified water form the second tank to a reservoir tank, pumping water from the reservoir tank through a filter, selectively feeding the filtered water through a water softener or direct to piping for end use, and automatically controlling levels in the tanks an treatment times for the water in the tanks to effect the desired reduction of the aforesaid inorganic contaminants, hardness, radionuclides, organic contaminants, odor, turbidity, discoloration and objectionable taste of the water.

13. A water treatment system which comprises a lime container, a lime mixer tank, means feeding lime from the container to the mixer tank, an air blower discharging to the lower portion of the lime mixer tank, an agitator in the lime mixer tank, means for feeding raw water to the lime mixer tank, an acid mixer tank, means feeding a liquid acid solution to the acid mixer tank, means transferring clarified water from the lime mixer tank to the acid mixer tank, means for agitating the water in the acid mixer tank, a reservoir tank, a water storage tank, a filter between said reservoir and water storage tanks, means pumping water from the reservoir tank through the filter to the water storage tank, and means maintaining filtered water in the water storage tank under pressure for end use.

14. The system of claim 13 including high and low level controls for the lime mixer and acid mixer tanks.

15. The system of claim 13 including a by-pass between the means for feeding raw water to the lime mixer tank to feed the water direct to the storage tank and an alarm energized when the water in the reservoir tank drops below a predetermined level.

16. The system of claim 13 wherein the lime container contains dry lime.

17. The system of claim 13 wherein the acid mixer tank receives a monosodium phosphate solution from the means feeding the tank.

18. The system of claim 13 including electrical controls and timers for regulating levels in the tanks and treatment times for the water in the tanks.

19. The system of claim 13 including a water softener receiving water from the storage tank.

20. The system of claim 19 including a water heater selectively receiving water from the softener.

* * * * *